US012601368B2

(12) United States Patent
Acosta et al.

(10) Patent No.: US 12,601,368 B2
(45) Date of Patent: *Apr. 14, 2026

(54) SPLIT COUPLER FOR PIPES

(71) Applicant: Mikeysquickcoupler LLC, Gillette, WY (US)

(72) Inventors: Michael L. Acosta, Gillette, WY (US); Timothy M. Acosta, Loveland, CO (US)

(73) Assignee: MikeysQuickCoupler LLC, Gillette, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/787,553

(22) Filed: Jul. 29, 2024

(65) Prior Publication Data

US 2024/0384745 A1 Nov. 21, 2024

Related U.S. Application Data

(63) Continuation of application No. 17/570,961, filed on Jan. 7, 2022, now Pat. No. 12,049,915, which is a continuation-in-part of application No. 16/991,829, filed on Aug. 12, 2020, now Pat. No. 11,384,873.

(60) Provisional application No. 62/961,375, filed on Jan. 15, 2020, provisional application No. 62/885,597, filed on Aug. 12, 2019.

(51) Int. Cl.
*F16L 21/06* (2006.01)
*F16B 37/08* (2006.01)
*F16L 19/02* (2006.01)

(52) U.S. Cl.
CPC ...... *F16B 37/0807* (2013.01); *F16L 19/0231* (2013.01)

(58) Field of Classification Search
CPC ....... F16L 19/00; F16L 19/02; F16L 19/0225; F16L 19/0231; F16L 19/06; F16L 19/061; F16L 19/065; F16L 47/04; F16L 55/17; F16L 55/1705; F16L 55/171; F16L 55/1715; F16L 55/168; Y10T 403/5786; Y10T 403/69; Y10T 403/7094; F16B 37/0892; F16B 37/0807
USPC .................................................. 411/433, 539
See application file for complete search history.

(56) References Cited

U.S. PATENT DOCUMENTS

| | | | |
|---|---|---|---|
| 10,113,669 B2 * | 10/2018 | Logan | F16L 5/08 |
| 12,049,915 B2 * | 7/2024 | Acosta | F16B 37/0892 |

* cited by examiner

*Primary Examiner* — Aaron M Dunwoody
(74) *Attorney, Agent, or Firm* — Craig R. Miles; CR MILES P.C.

(57) ABSTRACT

A split coupler, and methods of making and using such a split coupler, whereby the split coupler includes a first semi-cylindrical member, a second semi-cylindrical member, and an interlocking assembly configured to interlock the first and second semi-cylindrical members to form a substantially cylindrical coupler having a coupler inner surface which defines a throughbore. Additionally, the split coupler can include spiral threads coupled to the coupler inner surface. Furthermore, the split coupler can include a flange inwardly extending from the coupler inner surface.

20 Claims, 14 Drawing Sheets

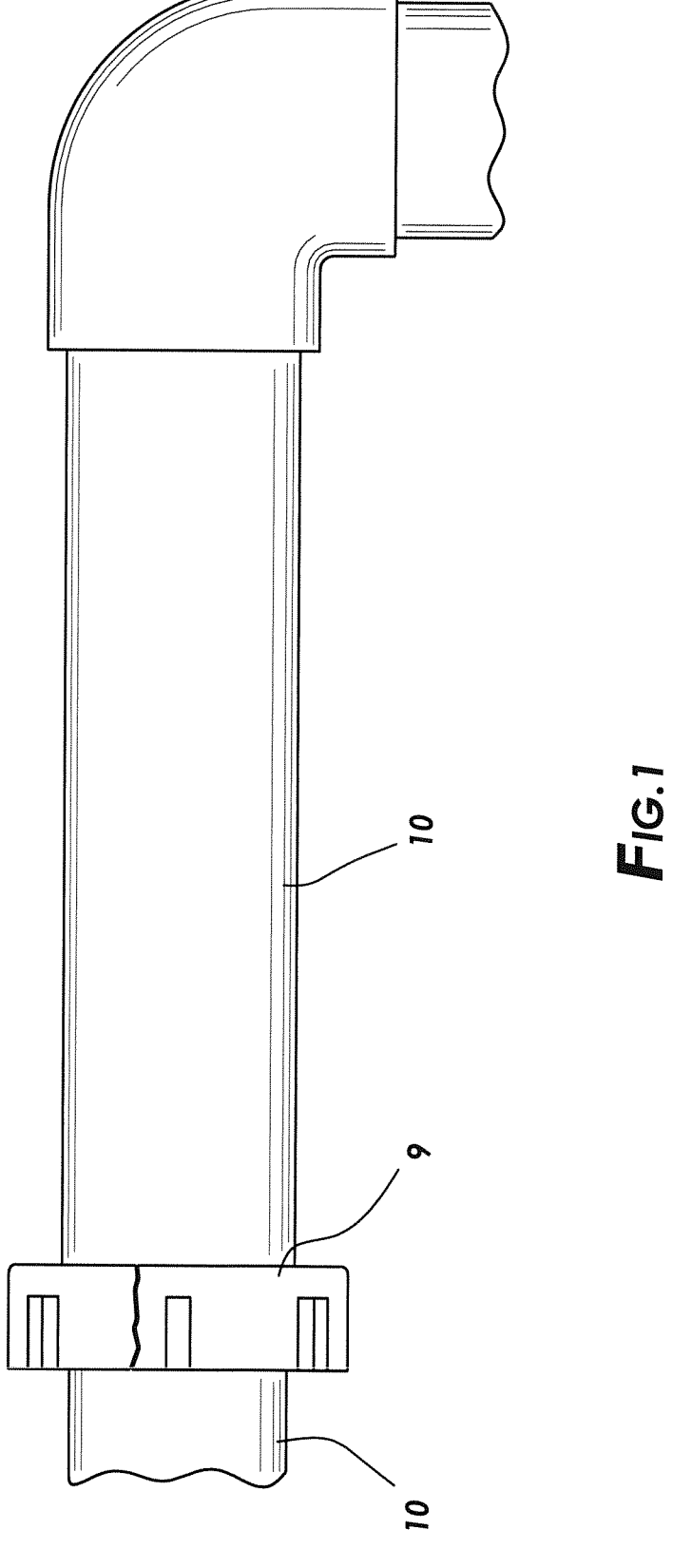
*F*IG.1

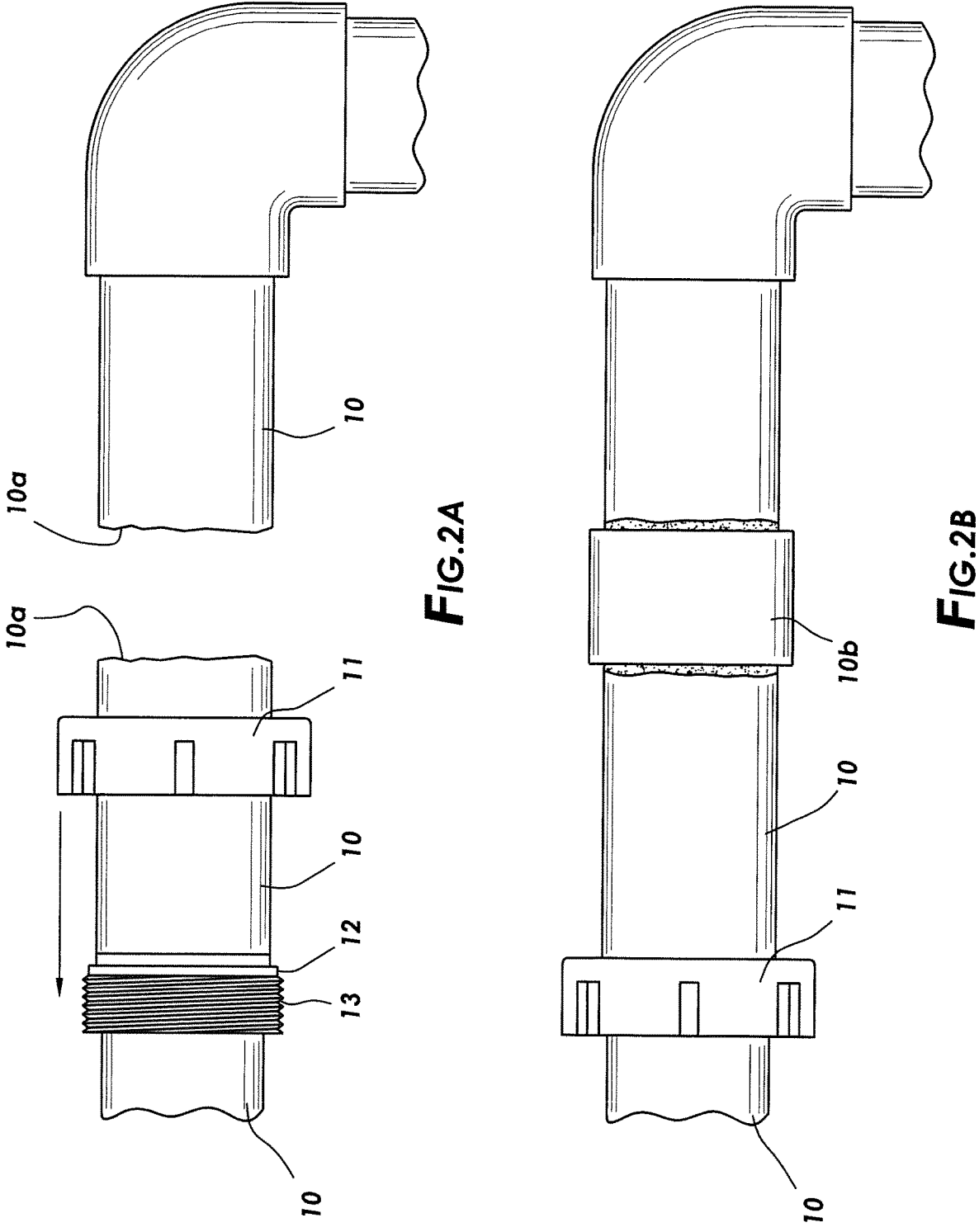
*F*IG.2A
*F*IG.2B

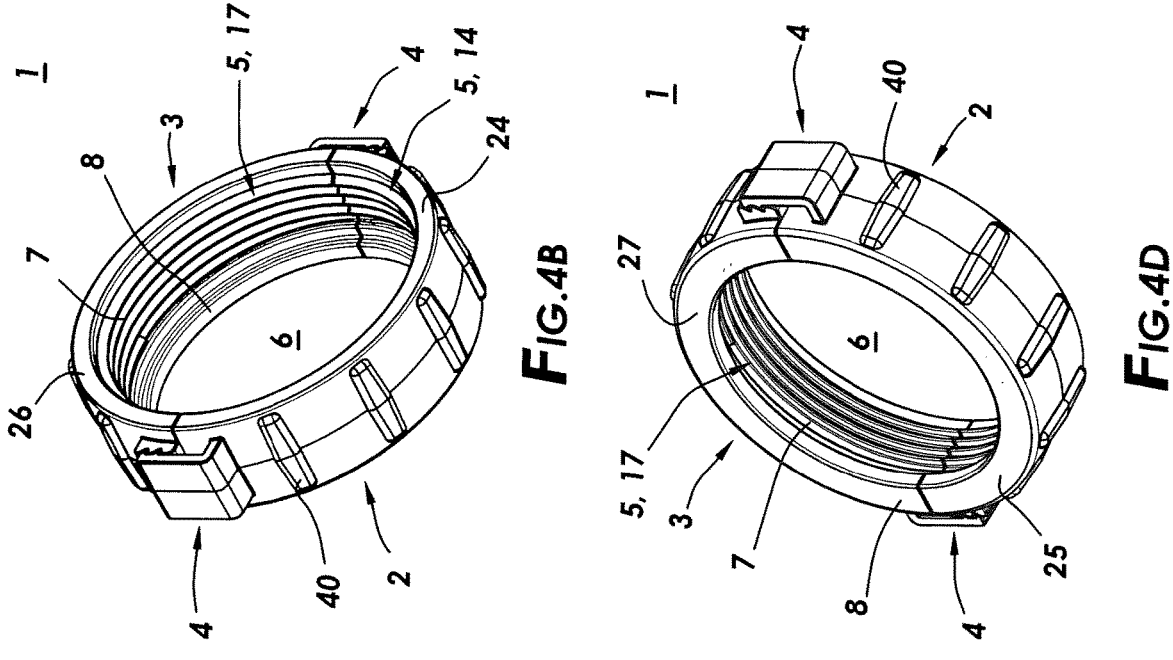
FIG.4B
FIG.4D
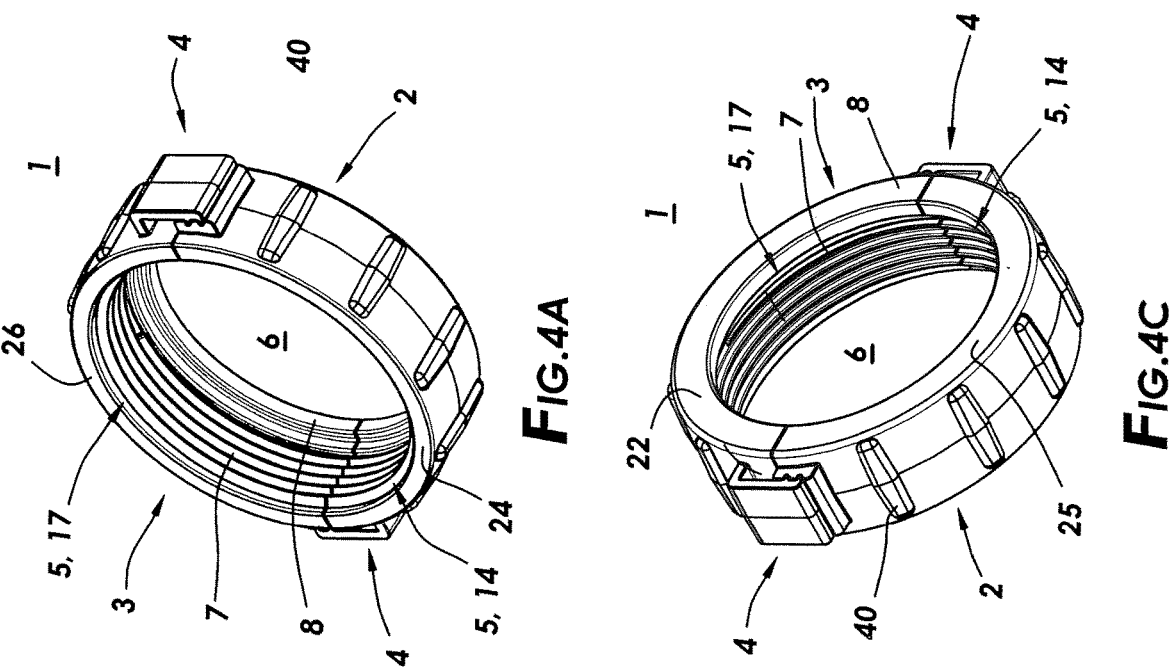
FIG.4A
FIG.4C

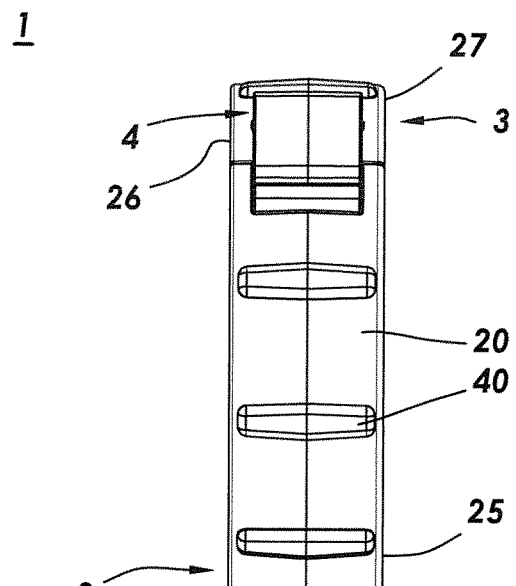
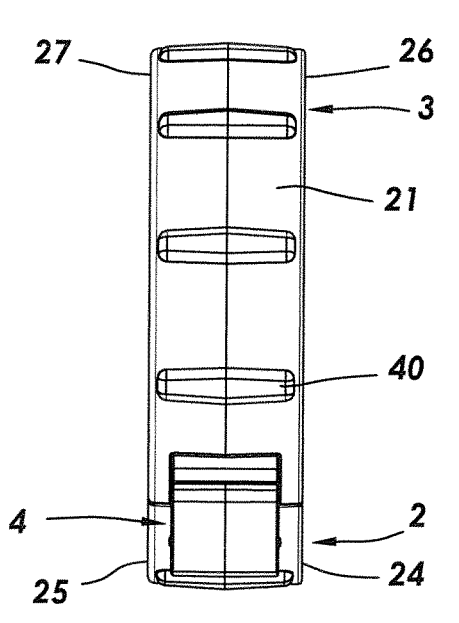
FIG.5C
FIG.5D
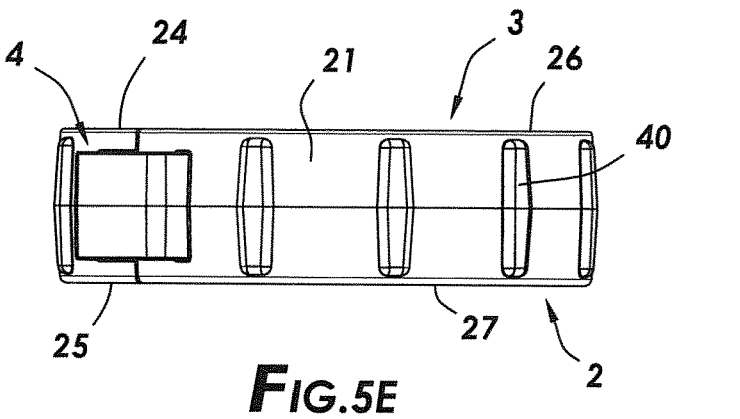
FIG.5E
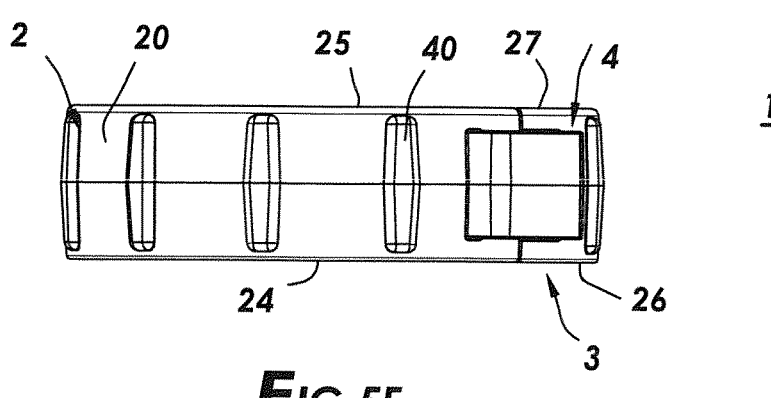
FIG.5F

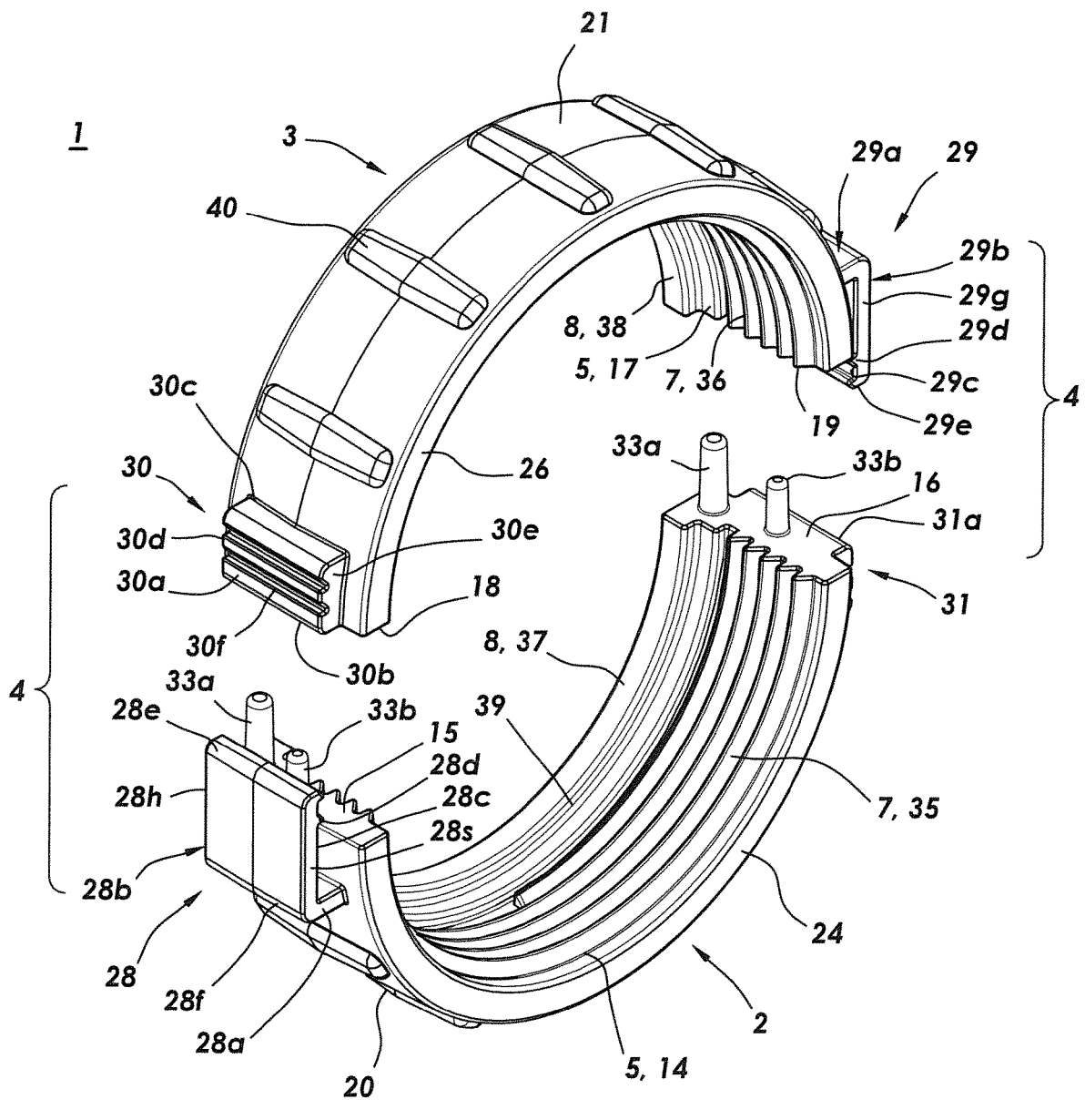
FIG.6D

SPLIT COUPLER FOR PIPES

BRIEF SUMMARY OF THE INVENTION

A broad object of a particular embodiment of the invention can be to provide a split coupler, and methods of making and using the split coupler, whereby the split coupler includes a first semi-cylindrical member, a second semi-cylindrical member, and an interlocking assembly configured to interlock the first and second semi-cylindrical members to form a substantially cylindrical coupler having a coupler inner surface which defines a throughbore. Additionally, the split coupler can include spiral threads coupled to the coupler inner surface. Furthermore, the split coupler can include a flange inwardly extending from the coupler inner surface into the throughbore.

Naturally, further objects of the invention are disclosed throughout other areas of the specification, drawings, and claims.

BRIEF DESCRIPTION OF THE DRAWINGS

FIG. 1 is an illustration of a conventional broken connector connecting two emplaced conduits.

FIG. 2A is an illustration of an emplaced conduit which has been cut to allow disposition of a conventional connector thereabout.

FIG. 2B is an illustration of the emplaced conduit shown in FIG. 2A, but whereby the cut portion has been repaired and the conventional connector is connecting two emplaced conduits.

FIG. 4A is a rear perspective view of a particular embodiment of the inventive split coupler.

FIG. 4B is another rear perspective view of the particular embodiment of the inventive split coupler shown in FIG. 4A.

FIG. 4C is a front perspective view of the particular embodiment of the inventive split coupler shown in FIG. 4A.

FIG. 4D is another front perspective view of the particular embodiment of the inventive split coupler shown in FIG. 4A.

FIG. 5C is a right side elevation view of the particular embodiment of the inventive split coupler shown in FIG. 5A.

FIG. 5D is a left side elevation view of the particular embodiment of the inventive split coupler shown in FIG. 5A.

FIG. 5E is a top plan view of the particular embodiment of the inventive split coupler shown in FIG. 5A.

FIG. 5F is a bottom plan view of the particular embodiment of the inventive split coupler shown in FIG. 5A.

FIG. 6D is another rear perspective view of the first and second semi-cylindrical members of a particular embodiment of the inventive split coupler shown in FIG. 6A.

DETAILED DESCRIPTION OF THE INVENTION

Figures 3A, 3B, 3C:
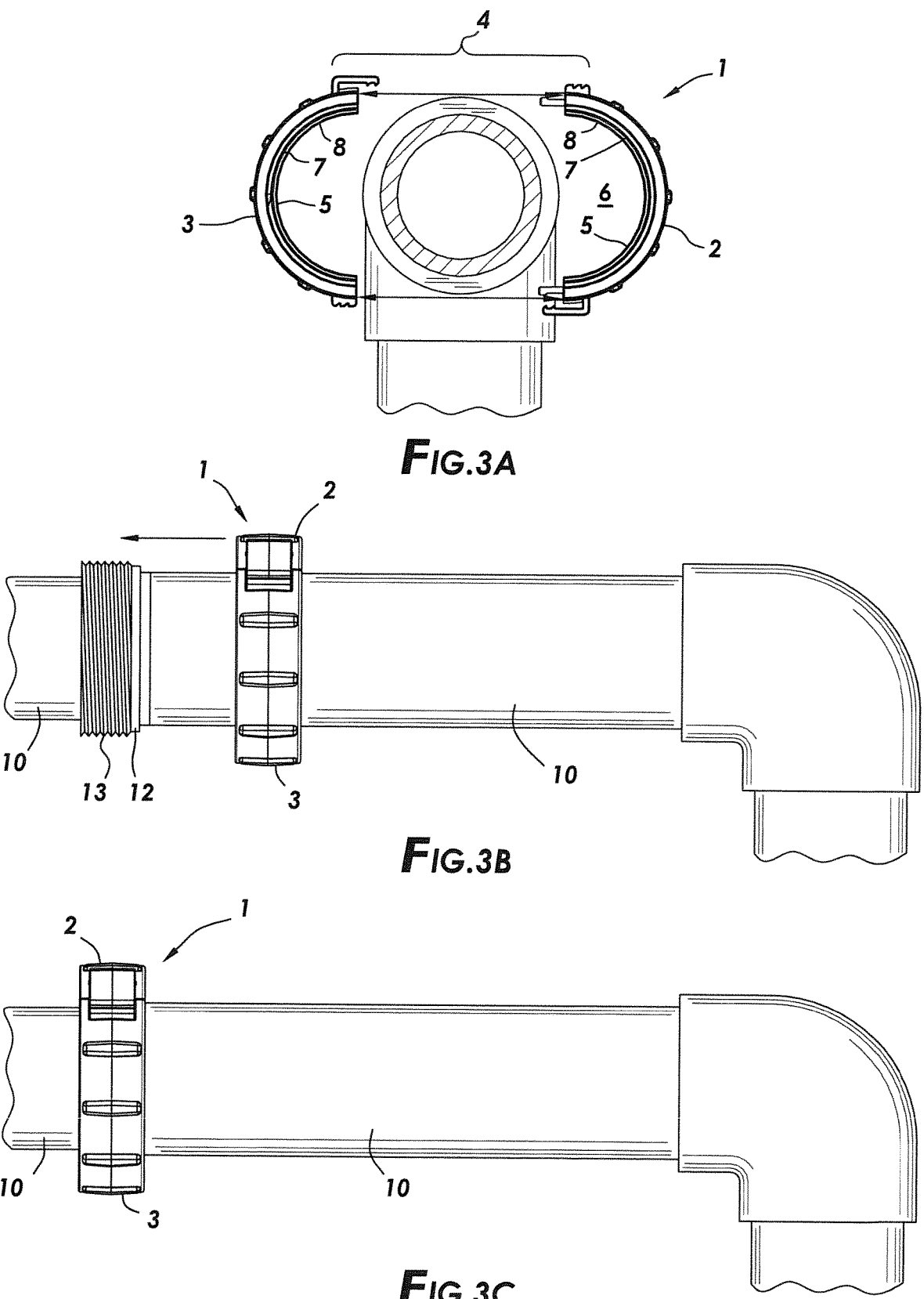
FIG. 3A is an illustration of a pair of semi-cylindrical members of a particular embodiment of the inventive split coupler disposed in opposed relation about an emplaced conduit.
FIG. 3B is an illustration of the inventive split coupler formed from the pair of interlocked semi-cylindrical members shown in FIG. 3A disposed about an emplaced conduit and axially movable axially toward a flanged pipe end engaged to a threaded pipe end of a pair of emplaced conduits.
FIG. 3C is an illustration of the inventive split coupler threadingly engaged to the threaded pipe end to draw the flanged pipe end toward the threaded pipe end to securely connect the pair of pipe ends to resist or prevent separation.
Figure 5B:
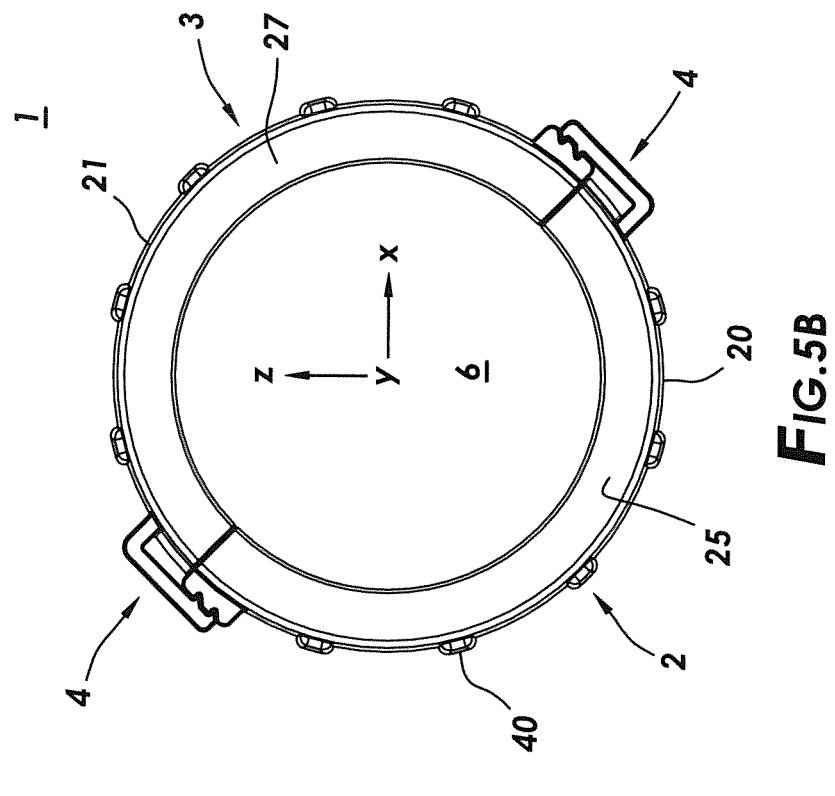
FIG. 5B is a front elevation view of the particular embodiment of the inventive split coupler shown in FIG. 5A.
Figure 5A:
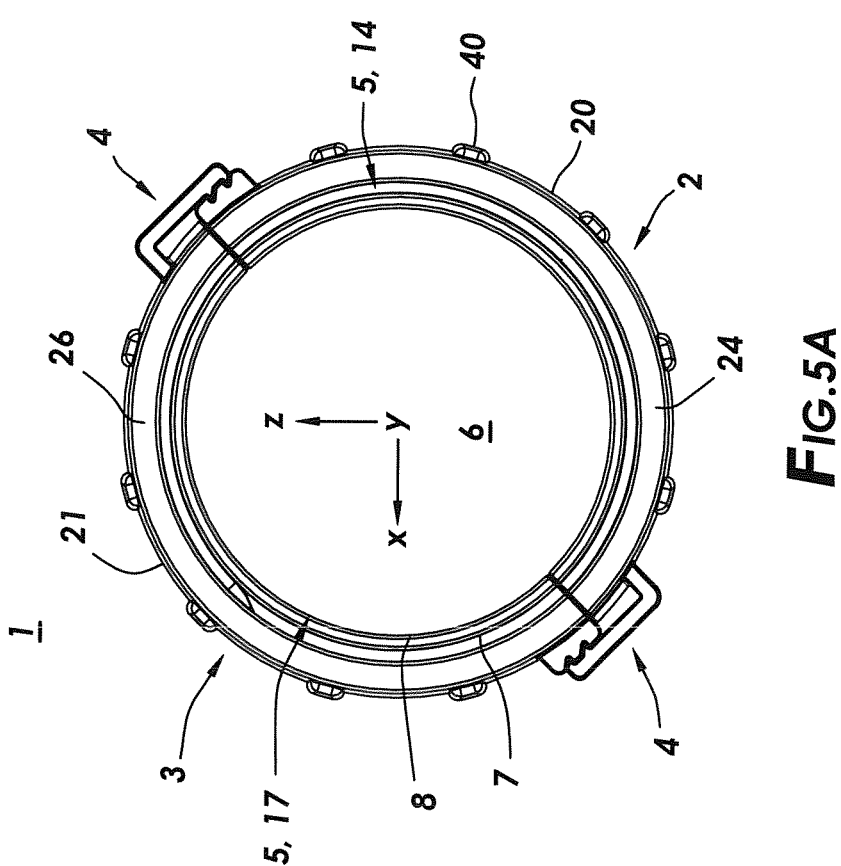
FIG. 5A is a rear elevation view of a particular embodiment of the inventive split coupler.
Figure 6A:
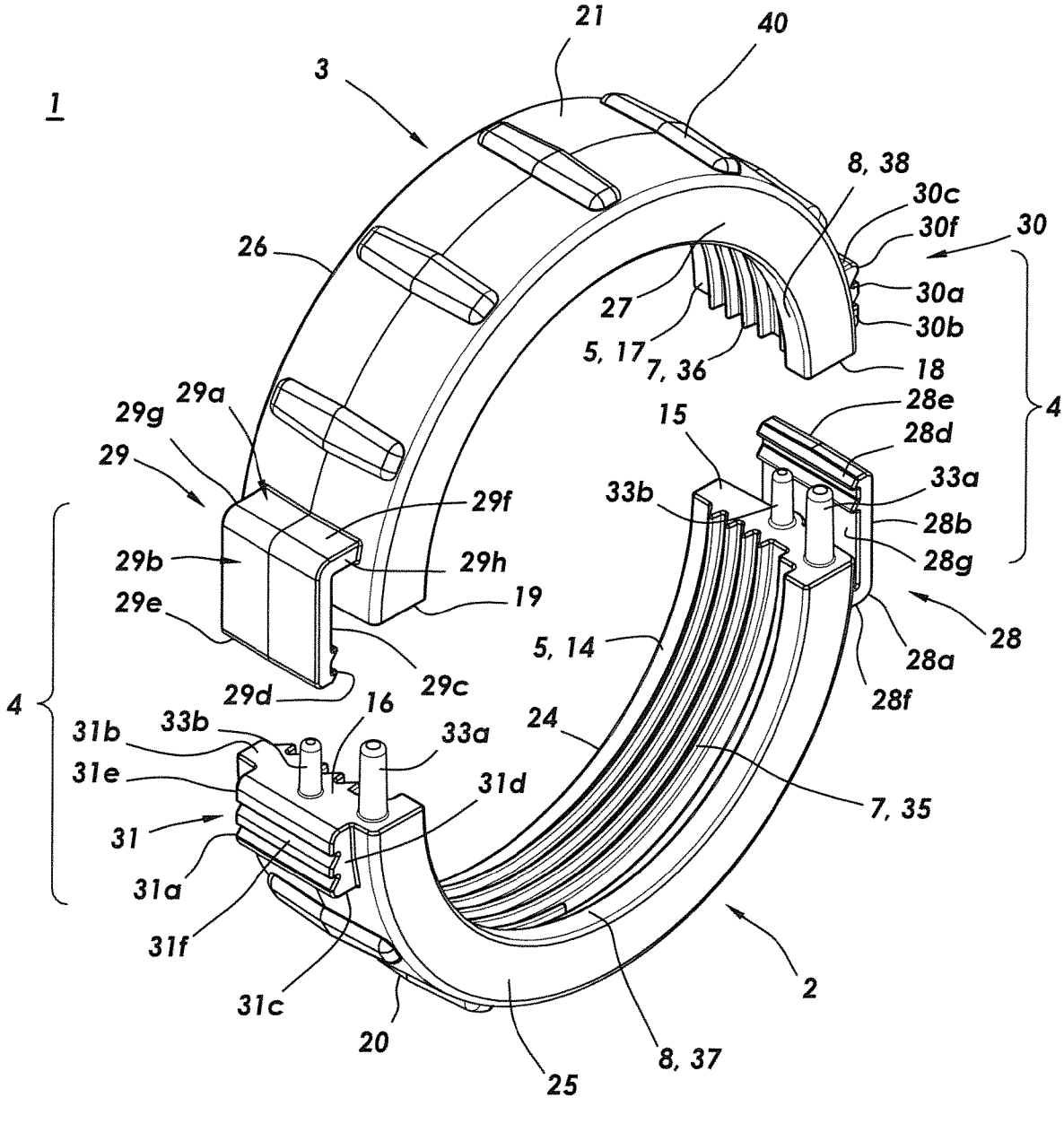
FIG. 6A is a front perspective view of the first and second semi-cylindrical members of a particular embodiment of the inventive split coupler.
Figure 6B:
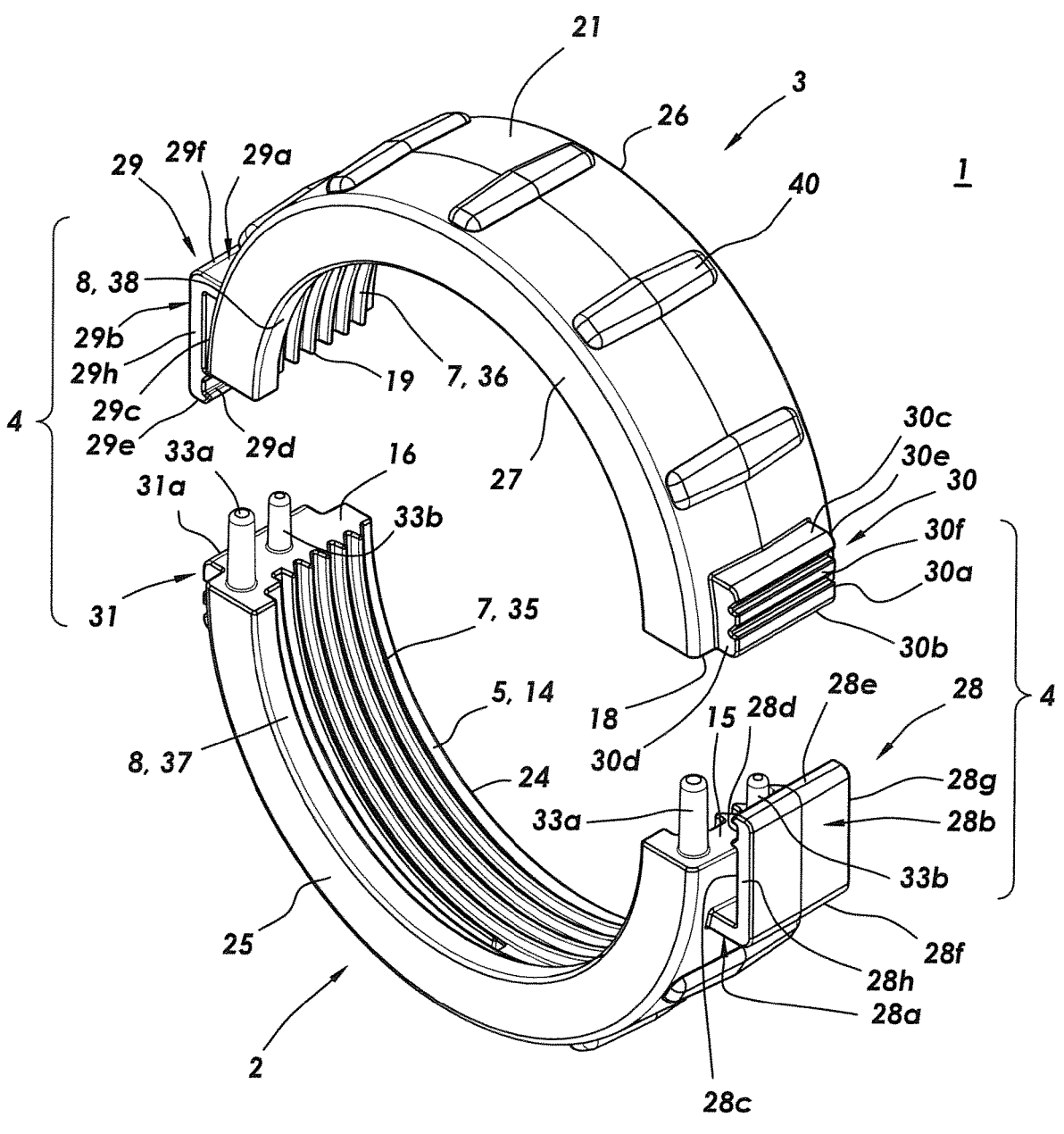
FIG. 6B is another front perspective view of the first and second semi-cylindrical members of a particular embodiment of the inventive split coupler shown in FIG. 6A.
Figure 6C:
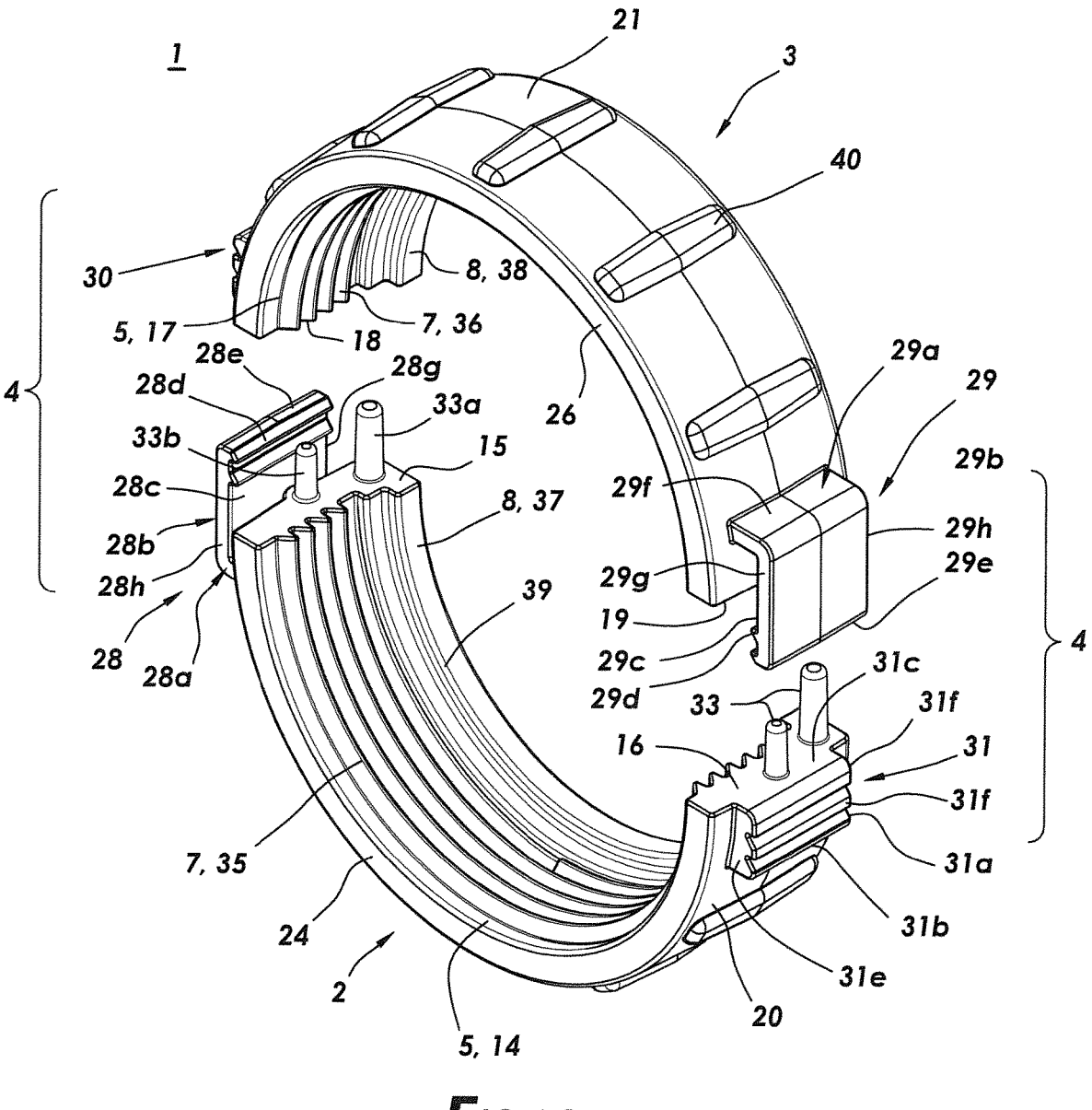
FIG. 6C is a rear perspective view of the first and second semi-cylindrical members of a particular embodiment of the inventive split coupler shown in FIG. 6A.
Figures 7A, 7B:
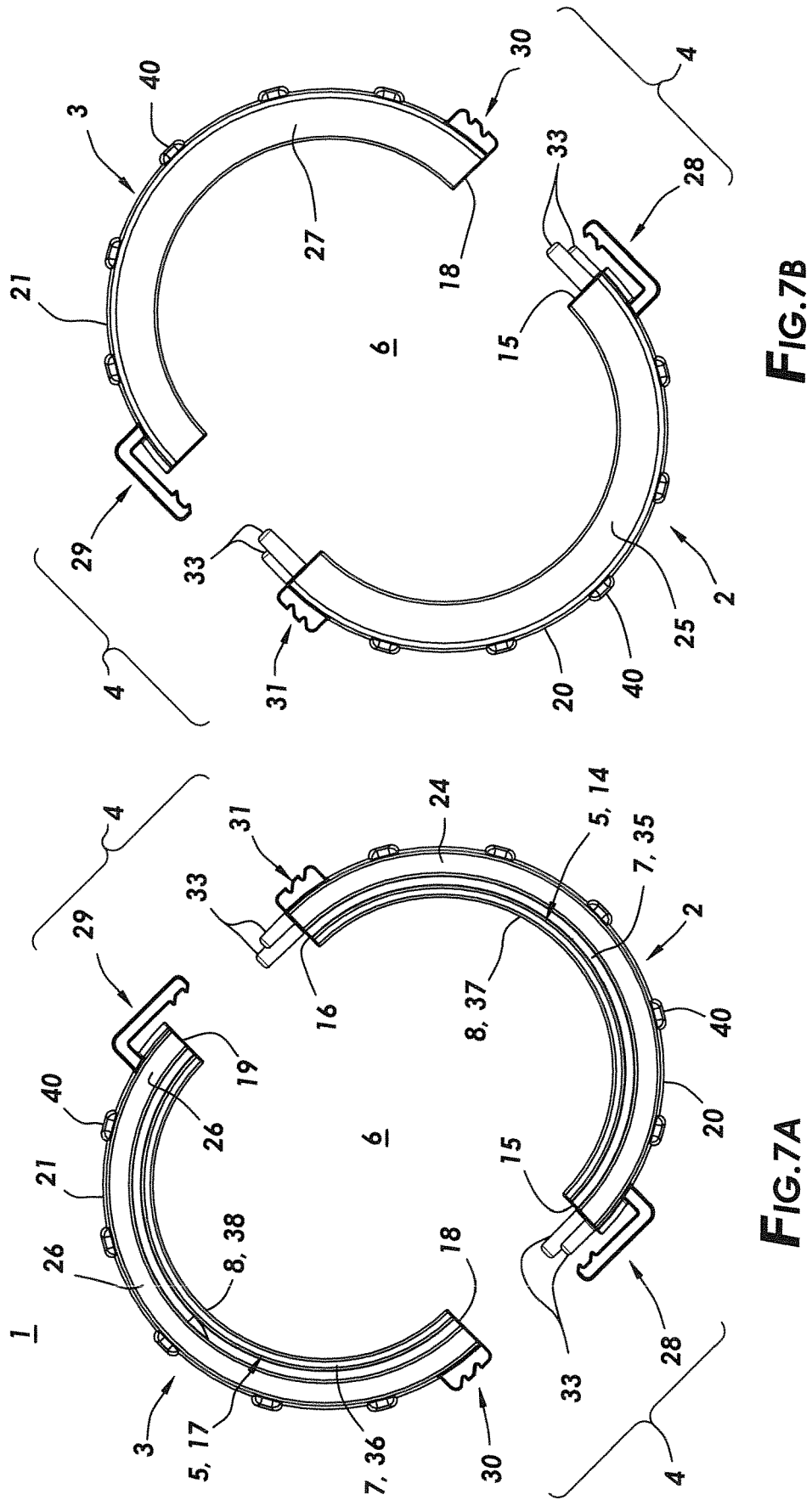
FIG. 7A is a rear elevation view of the first and second semi-cylindrical members of a particular embodiment of the inventive split coupler.
FIG. 7B is a front elevation view of the first and second semi-cylindrical members of the particular embodiment of the inventive split coupler shown in FIG. 7A.
Figures 7C, 7D, 7E, 7F:
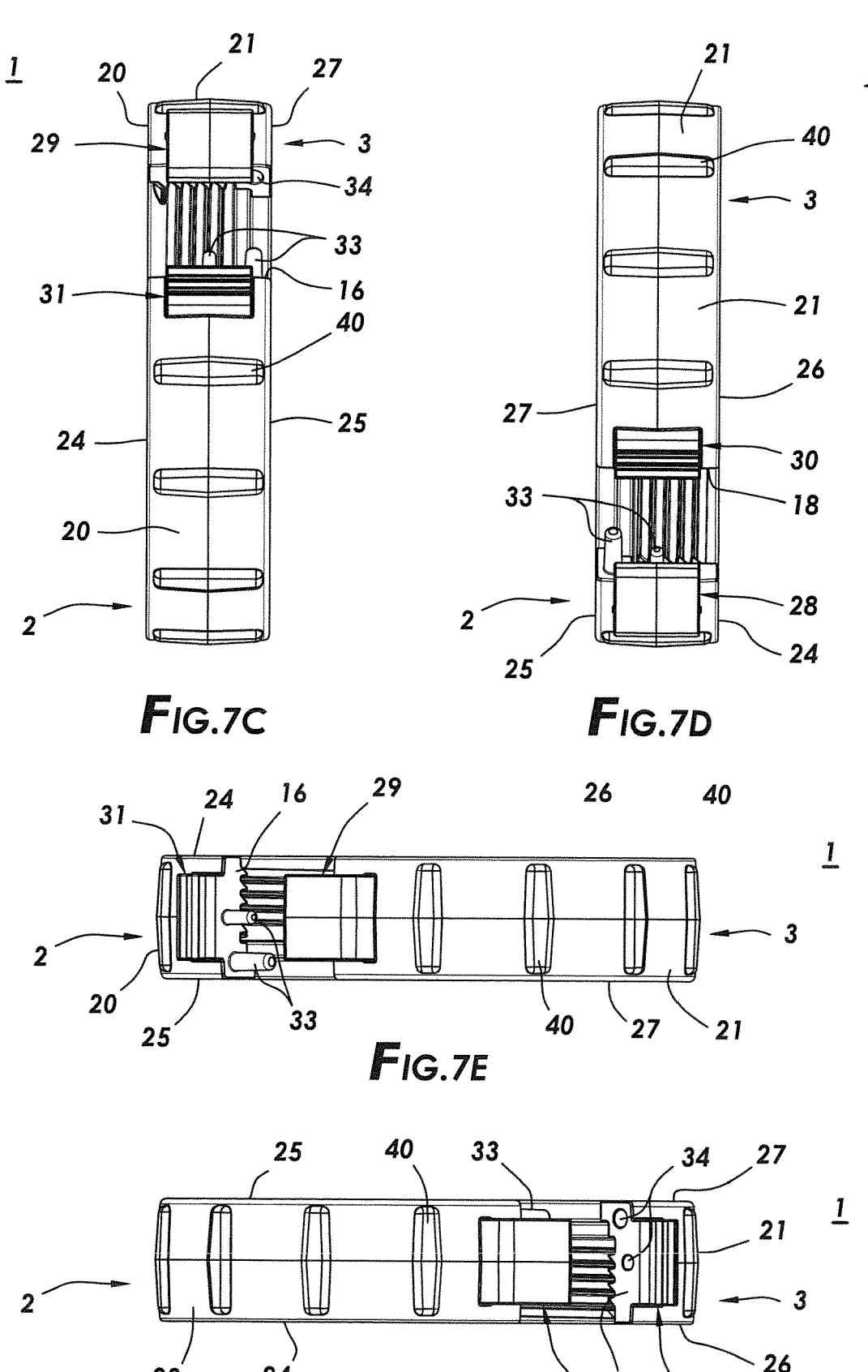
FIG. 7C is a right side elevation view of the first and second semi-cylindrical members of the particular embodiment of the inventive split coupler shown in FIG. 7A.
FIG. 7D is a left side elevation view of the first and second semi-cylindrical members of the particular embodiment of the inventive split coupler shown in FIG. 7A.
FIG. 7E is a top plan view of the first and second semi-cylindrical members of the particular embodiment of the inventive split coupler shown in FIG. 7A.
FIG. 7F is a bottom plan view of the first and second semi-cylindrical members of the particular embodiment of the inventive split coupler shown in FIG. 7A.
Figures 8A, 8B:
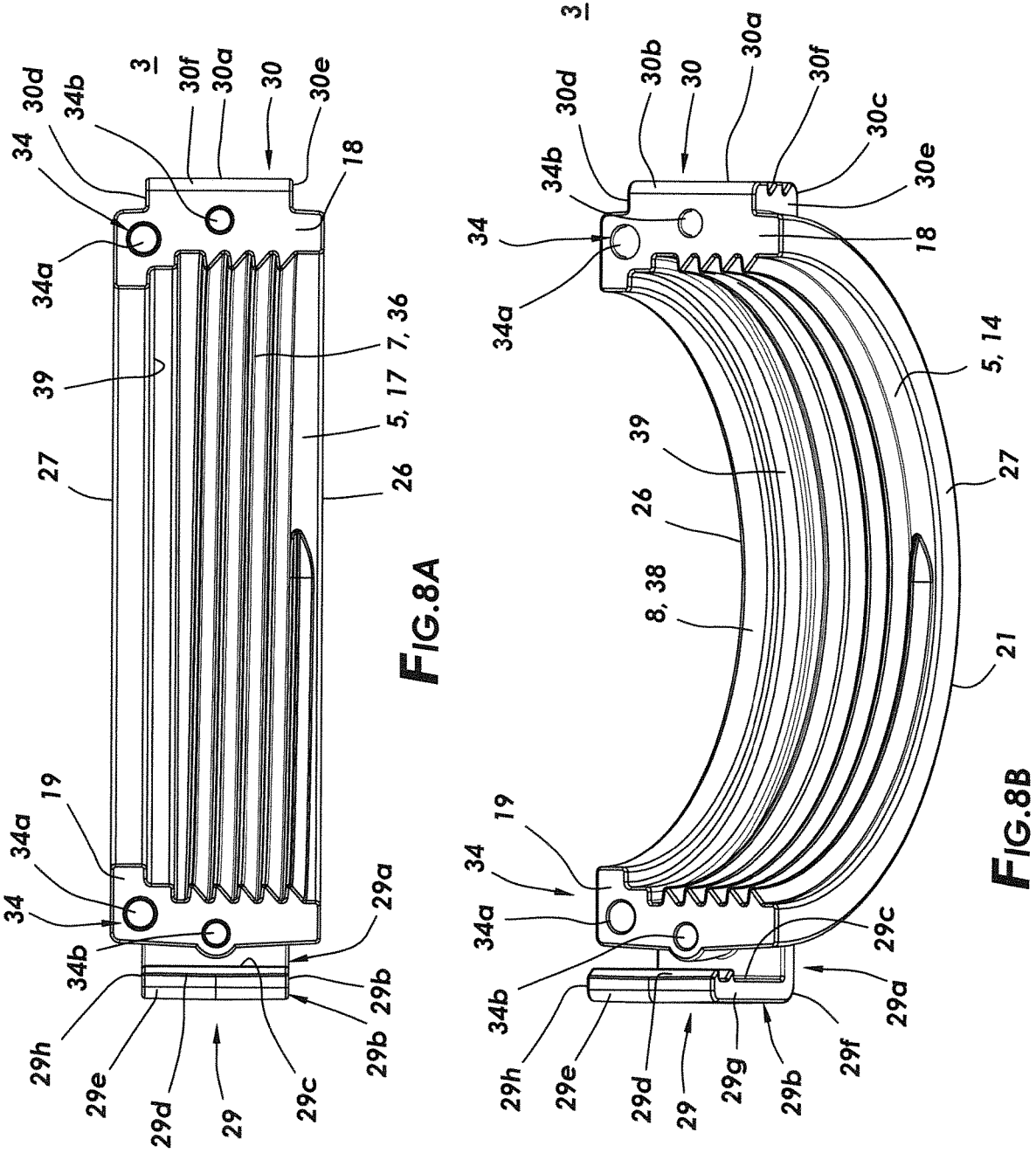
FIG. 8A is a top plan view of the inner surface and terminal edges of a particular embodiment of the first semi-cylindrical member of the inventive split coupler.
FIG. 8B is a perspective view of the inner surface and terminal edges of a particular embodiment of the first semi-cylindrical member of the inventive split coupler shown in FIG. 8A.
Figures 9A, 9B:
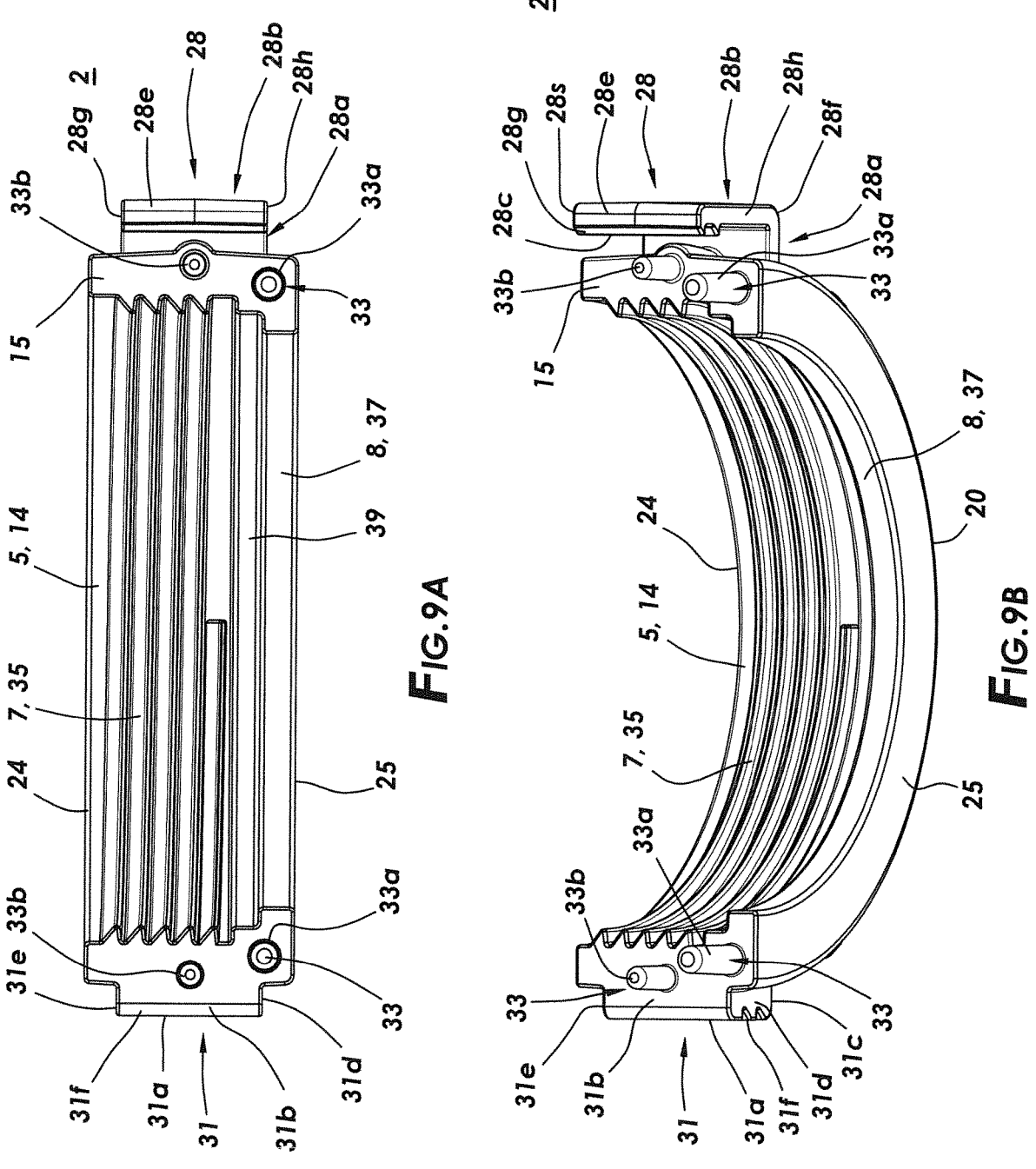
FIG. 9A is a top plan view of the inner surface and terminal edges of a particular embodiment of the second semi-cylindrical member of the inventive split coupler.
FIG. 9B is a perspective view of the inner surface and terminal edges of a particular embodiment of the second semi-cylindrical member of the inventive split coupler shown in FIG. 9A.

Now, with primary reference to FIG. 1, embodiments of the inventive split coupler (1) can be useful to replace a broken conventional connector (9) connecting emplaced conduits (10) or pipes.

Now, with primary reference to FIGS. 2A and 2B, the conventional connector (11) may be configured as a continuously annular cylinder. Consequently, to dispose such a connector (11) about an emplaced conduit (10), for example to replace a broken connector (9), the emplaced conduit (10) may have to be cut (10a) to allow removal of the broken conventional connector (9) and axial receipt of the conduit (10) within a replacement connector (11) to correspondingly dispose the connector (11) about the conduit (10) (as shown in the example of FIG. 2A).

Subsequently, the cut conduit (10) must be repaired (10*b*) (as shown in the example of FIG. 2B). It may be challenging to properly repair the cut conduit (10), but also the repaired conduit (10) may have inferior structural integrity relative to the original, uncut conduit (10).

Now, with primary reference to FIGS. 3A through 3C, which illustrate a particular method of using a particular embodiments of the inventive split coupler (1) illustrated in FIGS. 4A through 4D, 5A through 5F, 6A through 6D, 7A through 7F, 8A through 8B, and 9A through 9B, including a first semi-cylindrical member (2), a second semi-cylindrical member (3), and an interlocking assembly (4) configured to interlock (or connect together) the first and second semi-cylindrical members (2)(3) to form a substantially cylindrical split coupler (1) having a coupler inner surface (5) which defines a throughbore (6). Further, the split coupler (1) can include spiral threads (7) coupled to the coupler inner surface (5). Moreover, the split coupler (1) can include a flange (8) inwardly extending from the coupler inner surface (5). As opposed to a continuously annular cylinder of conventional connectors (9, 11), the inventive split coupler (1) is divided longitudinally. For the purposes of this invention the term "longitudinal" means the direction of the longitudinal axis of the conduit (10) about which the split coupler (1) is intended to dispose and correspondingly, the direction of the pass-through axis of the split coupler (1)). For the purposes of this invention, the term "axial" means along the direction of the longitudinal axis of the conduit (10) about which the split coupler (1) is intended to dispose, and/or the direction of the pass-through axis of the split coupler (1), and/or along the direction of the Y axis as shown in the example of FIGS. 5A through 5D. To replace a broken connector (9), the first and second semi-cylindrical members (2)(3) can be radially disposed about the emplaced conduit (10) to receive the conduit (10) therebetween. Next, the first and second semi-cylindrical members (2)(3) can be axially aligned and connected to one another to dispose the split coupler (1) about the emplaced conduit (10) (as shown in the example of FIG. 3A). Subsequently, the split coupler (1) can then be rotated about the conduit (10) to couple an end, such as a flanged end (12), of the emplaced conduit (10), to an end, such as a threaded end (13), of another adjacent, axially-aligned conduit (10) (as shown in the example of FIG. 3B). Upon coupling via the instant split coupler (1), the two conduits (10) can be securely connected or united and thus, precluded from relative separation (as shown in the example of FIG. 3C). Advantageously, the inventive method of replacing a conventional coupler (9, 11) with embodiments of the inventive coupler (1) does not require the emplaced conduit (10) to be cut to or otherwise removed or replaced to dispose the split coupler (1) thereabout.

Now, with primary reference to FIGS. 4*a* through 4D, 5A through 5F, 6A through 6D, 7A through 7F, 8A through 8B, and 9A through 9B, the longitudinally divided split coupler (1) includes first and second semi-cylindrical members (2)(3) which are separate or discrete or independent from one another. Each semi-cylindrical member (2)(3) includes an arcuate coupler inner surface (5) extending between opposing first and second terminal edges (15, 16)(18, 19). Specifically, the first semi-cylindrical member (2) can include a first semi-cylindrical member inner surface (14) extending between opposing first semi-cylindrical member first and second terminal edges (15)(16), and the second semi-cylindrical member (3) can include a second semi-cylindrical member inner surface (17) extending between opposing second semi-cylindrical member first and second terminal edges (18)(19). Each semi-cylindrical member (2)

(3) can include an arcuate outer surface, namely a first semi-cylindrical member outer surface (20) extending between the opposing first semi-cylindrical member first and second terminal edges (15)(16), and a second semi-cylindrical member outer surface (21) extending between the opposing second semi-cylindrical member first and second terminal edges (18)(19), whereby the outer surface (20)(21) can dispose in substantially parallel relation to the inner surface (14)(17); following, the wall disposed therebetween, namely a first semi-cylindrical member wall and a second semi-cylindrical member wall, can have a substantially uniform thickness between the terminal edges (15)(16)(18) (19). In addition to being connected together by the terminal edges (15)(16)(18)(19), the inner and outer surfaces can be connected together by opposing axial surfaces and specifically, the first semi-cylindrical member inner and outer surfaces (14)(20) can be connected together by opposing first semi-cylindrical member first and second axial surfaces (24)(25), and the second semi-cylindrical member inner and outer surfaces (17)(21) can be connected together by opposing second semi-cylindrical member first and second axial surfaces (26)(27).

Concerning size, the split coupler (1) and correspondingly, the first and second semi-cylindrical members (2)(3), can be proportioned in accordance with the conduits (10) about which they are intended to dispose and couple. For example, the split coupler (1) can be configured such that the throughbore (6) can be approximately the size of the outer diameter of the conduits (10) needing coupling.

To form the split coupler (1), the terminal edges (15)(16) (18)(19) of the first and second semi-cylindrical members (2)(3) can be matably engaged. The first semi-cylindrical member first terminal edge (15) can matably engage with the second semi-cylindrical member first terminal edge (18), and the first semi-cylindrical member second terminal edge (16) can matably engage with the second semi-cylindrical member second terminal edge (19).

Again, with primary reference to FIGS. 4*a* through 4D, 5A through 5F, 6A through 6D, 7A through 7F, 8A through 8B, and 9A through 9B, the split coupler (1) further includes an interlocking assembly (4) configured to interlock the first and second semi-cylindrical members (2)(3) to form the substantially cylindrical split coupler (1). As to particular embodiments, the interlocking assembly (4) can be disposed on the first or second cylindrical member outer surfaces (20)(21) proximate the first semi-cylindrical terminal edges (15)(16) and proximate the second terminal edges (18)(19) of the first and second semi-cylindrical members (2)(3). As to particular embodiments, the interlocking assembly (4) disposed proximate each of the first and second semi-cylindrical member first terminal edges (15)(18) can have a similar configuration or the same configuration as the interlocking assembly (4) disposed proximate each of the first and second semi-cylindrical member second terminal edges (16)(19); however, this not intended to preclude embodiments having the locking assembly (4) only associated proximate the first semi-cylindrical member first terminal edge (15) and proximate the second semi-cylindrical member first terminal edge (18) or only associated proximate the first semi-cylindrical member second terminal edge (16) and proximate the second semi-cylindrical member second terminal edge (19) in which the opposite first or second terminal edges (15)(18) or (16)(19) are otherwise joined or secured, for example, by a hinge or a pivot.

Now, with primary reference to FIGS. 6A through 6D, as to particular embodiments, the interlocking assembly (4) can include a first engagement member in the form of a first latch

(28) carried by the first semi-cylindrical member outer surface (20) proximate the first semi-cylindrical member first terminal edge (15) and a second latch (29) carried by the second semi-cylindrical member outer surface (21) proximate the second semi-cylindrical member second terminal edge (19), and a second engagement member in the form of a first catch (30) carried by the second semi-cylindrical member outer surface (21) proximate the second semi-cylindrical member first terminal edge (18), and by a second catch (31) carried by the first semi-cylindrical member outer surface (20) proximate the first semi-cylindrical member second terminal edge (16). Each of the first and second latch (28, 29) correspondingly mates with the first and second catch (30, 31) to resist or prevent separation of the first semi-cylindrical member (2) from the second semi-cylindrical member (3).

The first catch (30) radially extends from the second semi-cylindrical member outer surface (21) proximate the second semi-cylindrical member first terminal edge (18), and the second catch (31) radially extends from the first semi-cylindrical member outer surface (20) proximate the first semi-cylindrical member second terminal edge (16). The first catch (30) defines a first catch face (30a) disposed circumferentially around the second semi-cylindrical member outer surface (21) between a pair of first catch end ends (30b, 30c). The second catch (31) defines a second catch face (31a) disposed circumferentially around the first semi-cylindrical member outer surface (20) between a pair of second catch ends (31b, 31c). Each of the first and second catch face (30a, 31a) can respectively include one or more catch teeth (30f, 31f) disposed in spaced apart relation between the respective pair of first catch ends (30b, 30c) and the pair of second catch ends (31b, 31c) and respectively axially extending between a pair of first catch sides (30d, 30c) a pair of second catch sides (31d, 31c).

Again, with primary reference to FIGS. 6A through 6D, the first latch (28) includes a proximate latch arm portion (28a) radially extending from the first semi-cylindrical member outer surface (20) proximate the first semi-cylindrical member first terminal edge (15) and a distal latch arm portion (28b) coupled generally orthogonal to the first latch arm portion (28a) and extending beyond the first semi-cylindrical member first terminal edge (15). The second latch (29) includes a proximate latch arm portion (29a) radially extending from the second semi-cylindrical member outer surface (21) proximate the second semi-cylindrical member first terminal edge (19) and a distal latch arm portion (29b) coupled generally orthogonal to the first latch arm portion (29a) and extending beyond the second semi-cylindrical member second terminal edge (19). Each of the first and second latch (28, 29) distal latch arm portions (28b, 29b) respectively define a first latch inner face (28c) and a second latch inner face (29c) and each can include one or more latch teeth (28d, 29d) respectively disposed in spaced apart relation between a pair of first latch ends (28c, 28f) and a pair of second latch arm ends (29e, 29f) and respectively axially extending between a pair of first latch arm sides (28g, 28h) and a pair of second latch arm sides (29g, 29h). Each of the first and second distal latch arm portions (28c, 29c) can extend sufficiently beyond the corresponding first semi-cylindrical member first terminal edge (15) and second semi-cylindrical member second terminal edge (19) to engage the corresponding first catch (30) and second catch (31) upon aligned engagement of the first semi-cylindrical member (2) with the second semi-cylindrical member (3).

Now, with primary reference to FIGS. 6A through 6D and 7A through 7B, and 8A through 8B and 9A through 9B, the first semi-cylindrical member (2) and the second semi-cylindrical member (3) can include an alignment assembly (32) which operates to align the first semi-cylindrical member first terminal edge (15) with the second semi-cylindrical member first terminal edge (18) and to align the first semi-cylindrical member second terminal edge (16) with the second semi-cylindrical member second terminal edge (19). In particular embodiments, the alignment assembly (32) can include one or more alignment pins (33) extending from one of the first semi-cylindrical member first terminal edge (15) or from the second semi-cylindrical member first terminal edge (18) which can be mateably slidably received by corresponding one or more alignment sockets (34) disposed in the opposite first semi-cylindrical member first terminal edge (15) or in the second semi-cylindrical member first terminal edge (18), and one or more alignment pins (33) extending from one of the first semi-cylindrical member second terminal edge (16) or from the second semi-cylindrical member second terminal edge (18) which can be mateably slidably received by corresponding one or more alignment sockets (34) disposed in the opposite first semi-cylindrical member second terminal edge (16) or in the second semi-cylindrical member second terminal edge (19). In the illustrative examples of FIGS. 6A through 6D, two alignment pins (33a, 33b) extend from each of the first semi-cylindrical member first and second terminal edges (15, 16) to be correspondingly slidably received by two alignment sockets (34a, 34b) disposed in each of the second semi-cylindrical member first and second terminal edges (18, 19); however, this is not intended to preclude other embodiments having the alignment pins (33) extending from the second semi-circular member first and second terminal edges (18, 19) and the corresponding alignment sockets (34) disposed in first semi-circular member first and second terminal edges (15, 16). The purpose of the alignment assembly is to axially align engagement of the first and second semi-cylindrical member terminal edges (15, 18 and 16, 19) to correspondingly axially align each catch (30, 31) with the corresponding latch (28, 29) to allow sliding engagement of the each catch face (30a, 31a) with a corresponding latch inner face (28c, 29c). As the alignment sockets (34) corresponding slidingly receive the alignment pins (33), each latch (28, 29) resiliently flexes to allow the latch inner faces (28c, 29c) to correspondingly slide over the catch faces (30a, 31a). In those embodiments, which include a catch face (30a, 31a) having catch teeth (30f, 31f) and a latch inner face having latch teeth (28d, 29d), the respective catch teeth (30f, 31f) and latch teeth (28d, 29d) interdigitate upon engagement of the corresponding first and second semi-circular member terminal edges (15, 18 and 16, 19), to interlock the first semi-circular member (2) with second semi-circular member (3).

As to particular embodiments, the locking assembly (4) can be integrated with the first semi-cylindrical member (2) or the second semi-cylindrical member (3) to provide a one-piece or single or monolithic or integrated construct, meaning typically inseparable under normal conditions during routine use.

Again, with primary reference to FIGS. 4A through 4D, 6A through 6D, 8A through 8B, and 9A through 9B, the split coupler (1) can include spiral threads (7) coupled to the coupler inner surface (5) (i) about the throughbore (6) and/or (ii) to extend into the throughbore (6), whereby this internal threading can be configured to match an externally threaded end (13) of a conduit (10).

As the split coupler (1) is comprised of the first and second semi-cylindrical members (2)(3), the first semi-cylindrical member (2) can include first threads (35) coupled to the first semi-cylindrical member inner surface (14) and extending between the first semi-cylindrical member first and second terminal edges (15)(16), and the second semi-cylindrical member (3) can include second threads (36) coupled to the second semi-cylindrical member inner surface (17) and extending between the second semi-cylindrical member first and second terminal edges (18)(19). The first and second threads (35)(36) can each be configured as parallel and axially offset; following, upon interlocking of the first and second semi-cylindrical members (2)(3), the first and second threads (35)(36) can axially align to form spiral threads (7) proximate the coupler inner surface (5).

Again referring primarily to FIGS. 4A through 4D, 6A through 6D, 8A through 8B, and 9A through 9B, as to particular embodiments, the split coupler (1) can further include an annular flange (8) radially inwardly extending from the coupler inner surface (5), whereby the flange (8) can be configured to axially and abuttingly engage with a flanged end (12) of a conduit (10) to catch that conduit (10) and secure it to another conduit (10) having a threaded end (13) so as to form, when screwed together via the split coupler (1), a secure connection between the conduits (10).

As the split coupler (1) is comprised of the first and second semi-cylindrical members (2)(3), the first semi-cylindrical member (2) can include a first flange (37) radially inwardly extending from the first semi-cylindrical member inner surface (14) between the first semi-cylindrical member first and second terminal edges (15)(16), and the second semi-cylindrical member (3) can include a second flange (38) radially inwardly extending from the second semi-cylindrical member inner surface (17) between the second semi-cylindrical member first and second terminal edges (18)(19). Upon interlocking of the first and second semi-cylindrical members (2)(3), the first and second flanges (37)(38) can axially align to form the annular flange (8) which radially extends into the throughbore (6).

The flanges (37)(38) can be correspondingly coupled to the inner surface (14)(17) of the semi-cylindrical member (2)(3) proximate the second axial surface (25)(27) or said another way, the flange (37)(38) can axially inwardly extend from the second axial surface (25)(27). Correspondingly, the threads (35)(36) can begin proximate the first axial surface (24)(26) of the semi-cylindrical member (2)(3) and terminate proximate a flange interior portion (39). Following, in use, to connect an emplaced conduit (10) having a flanged end (12) with an emplaced conduit (10) having a threaded end (13), the first and second semi-cylindrical members (2)(3) can be disposed about the conduit (10) having the flanged end (12) to position the first axial surface (24)(26) toward the conduit (10) having the threaded end (13). After the first and second semi-cylindrical members (2)(3) are interlocked, the split coupler (1) can be axially moved or slid toward the ends (12)(13) until the beginning of the spiral threads (7) engages with the threaded end (13). Subsequently, the split coupler (1) can be rotated to engage the threads (7)(13) and abuttingly engage the annular flange (8) with the flanged end (12) to securely connect the conduits (10).

It will be understood that, of course, in addition to a ready installation of the inventive coupler (1) as compared to a conventional connector (11)) about an emplaced conduit (10) which does not mandate cutting the conduit (10), the instant split coupler (1) can also be relatively easily removed (versus a conventional connector (11)) from an emplaced conduit (10), for example by simply reversing the installation procedure, without having to cut a conduit (10) for removal.

Now referring primarily to FIGS. 4A through 4D, 5A through 5F, 6A thorough 6D and 7A through 7F, as to particular embodiments, each of the first and second semi-cylindrical members (2)(3) can further include one or more grip elements (40) coupled to the outer surface (20)(21), whereby the grip elements (40) can facilitate interlocking the first and second semi-cylindrical members (2)(3) and/or fastening the split coupler (1) about emplaced conduits (10). As but one illustrative example, a grip element (40) can be configured as a protrusion radially outwardly extending from the outer surface (20)(21), whereby a plurality of protrusions can be disposed in circumferentially spaced apart relation proximate the outer surface (20)(21) (as shown in the examples of FIGS. 4A through 4D, 5A through 5F). As but a second illustrative example, a grip element (40) can be configured as a recess radially inwardly extending into the outer surface, whereby a plurality of recesses can be disposed in circumferentially spaced apart relation proximate the outer surface (20)(21).

Now regarding production, a method of making the instant split coupler (1) can include providing a first semi-cylindrical member (2) and a second semi-cylindrical member (3), both having an interlocking assembly (4) configured to interlock the first and second semi-cylindrical members (2)(3) to form a substantially cylindrical split coupler (1) having a coupler inner surface (5) which defines a throughbore (6). Further, the method can include coupling first threads (35) to the first semi-cylindrical member inner surface (14) and coupling second threads (36) to the second semi-cylindrical member inner surface (17). Moreover, the method can further include coupling a first flange (37) to the first semi-cylindrical member inner surface (14) and coupling a second flange (38) to the second semi-cylindrical member inner surface (17).

The method of making particular embodiments of the split coupler (1) can further include providing additional components of the split coupler (1) as described above and in the claims.

As can be easily understood from the foregoing, the basic concepts of the present invention may be embodied in a variety of ways. The invention involves numerous and varied embodiments of a split coupler and methods for making and using such a split coupler.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or a method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in Merriam-Webster's Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about", it will be understood that the particular value forms another embodiment. The term "about" generally refers to a range of numeric values that one of skill in the art would consider equivalent to the recited numeric value or having the same function or result. Similarly, the antecedent "substantially" or "generally" means largely, but not wholly, the same form, manner or degree and the particular element will have a range of configurations as a person of ordinary skill in the art would consider as having the same function or result. When a particular element is expressed as an approximation by use of the antecedent "substantially" or "generally", it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Thus, the applicant should be understood to claim at least: (i) each embodiment of the split coupler herein disclosed and described, (ii) the related methods disclosed and described, (iii) similar, equivalent, and even implicit variations of each of these apparatuses and methods, (iv) those alternative embodiments which accomplish each of the functions shown, disclosed, or described, (v) those alternative designs and methods which accomplish each of the functions shown as are implicit to accomplish that which is disclosed and described, (vi) each feature, component, and step shown as separate and independent inventions, (vii) the applications enhanced by the various systems or components disclosed, (viii) the resulting products produced by such systems or components, (ix) methods and apparatuses substantially as described hereinbefore and with reference to any of the accompanying examples, and (x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of embodiments of the invention and are not to be construed as the broadest embodiment of the invention or a complete listing of embodiments of the invention that may be claimed. The applicant does not waive any right to develop further claims based upon the description set forth above or in the drawings as a part of any continuation, division, continuation-in-part, or similar application.

We claim:

1. A split coupler, comprising:
a first semi-cylindrical member including a first thread coupled to a first semi-cylindrical member inner surface;
a second semi-cylindrical member including a second thread coupled to a second semi-cylindrical member inner surface;
a first interlocking assembly comprising (i) a first latch outwardly extending from a first semi-cylindrical member outer surface proximate a first semi-cylindrical member first terminal edge, and (ii) a first catch outwardly extending from a second semi-cylindrical member outer surface proximate a second semi-cylindrical member first terminal edge;
one or more first latch teeth coupled to said first latch;
one or more first catch teeth coupled to said first catch;
wherein said one or more first latch teeth interlock with said one or more first catch teeth to resist or prevent separation of said first semi-cylindrical member first terminal edge from said second semi-cylindrical member first terminal edge;

a second interlocking assembly comprising (i) a second catch outwardly extending from said first semi-cylindrical member outer surface proximate a first semi-cylindrical member second terminal edge, and (ii) a second latch outwardly extending from said second semi-cylindrical member outer surface proximate a second semi-cylindrical member second terminal edge;

one or more second catch teeth coupled to said second catch; and one or more second latch teeth coupled to said second latch;

wherein said one or more second catch teeth interlock with said one or more second latch teeth to resist or prevent separation of said first semi-cylindrical member second terminal edge from said second semi-cylindrical member second terminal edge.

2. The split coupler of claim 1, wherein said first semi-cylindrical member and said second semi-cylindrical member together form a cylindrical coupler having a coupler inner surface defining a throughbore.

3. The split coupler of claim 1, wherein said first latch and said first catch slidably interlock and said second latch and said second catch slidably interlock to resist or prevent separation of said first semi-cylindrical member from said second semi-cylindrical member.

4. The split coupler of claim 1, said first semi-cylindrical member including a first flange radially inwardly extending from said first semi-cylindrical member inner surface.

5. The split coupler of claim 4, said second semi-cylindrical member comprising a second flange radially inwardly extending from said second semi-cylindrical member inner surface.

6. The split coupler of claim 5, wherein upon engagement of said first and second semi-cylindrical members, said first and second flanges axially align to form an annular flange radially inwardly extending from a coupler inner surface.

7. The split coupler of claim 1, wherein engagement of said first and second semi-cylindrical members axially aligns said first and second threads to form a spiral thread.

8. A split coupler, comprising:

a first semi-cylindrical member including a first thread coupled to said first semi-cylindrical member inner surface;

a second semi-cylindrical member including a second thread coupled to said second semi-cylindrical member inner surface;

a first interlocking assembly comprising (i) a first latch outwardly extending from a first semi-cylindrical member outer surface proximate a first semi-cylindrical member first terminal edge, and (ii) a first catch outwardly extending from a second semi-cylindrical member outer surface proximate a second semi-cylindrical member first terminal edge;

one or more first latch teeth coupled to said first latch; and one or more first catch teeth coupled to said first catch;

wherein said one or more first latch teeth interlock with said one or more first catch teeth to resist or prevent separation of said first semi-cylindrical member first terminal edge from said second semi-cylindrical member first terminal edge.

9. The split coupler of claim 8, further comprising:

a second interlocking assembly comprising (i) a second catch outwardly extending from said first semi-cylindrical member outer surface proximate a first semi-cylindrical member second terminal edge, and (ii) a second latch outwardly extending from said second semi-cylindrical member outer surface proximate a second semi-cylindrical member second terminal edge;

one or more second catch teeth coupled to said second catch; and one or more second latch teeth coupled to said second latch;

wherein said one or more second catch teeth interlock with said one or more second latch teeth to resist or prevent separation of said first semi-cylindrical member second terminal edge from said second semi-cylindrical member second terminal edge.

10. The split coupler of claim 9, wherein said first semi-cylindrical member and said second semi-cylindrical member together form a cylindrical coupler having a coupler inner surface defining a throughbore.

11. The split coupler of claim 9, wherein said first latch and said first catch slidably interlock and said second latch and said second catch slidably interlock to resist or prevent separation of said first semi-cylindrical member from said second semi-cylindrical member.

12. The split coupler of claim 9, said first semi-cylindrical member including a first flange radially inwardly extending from said first semi-cylindrical member inner surface.

13. The split coupler of claim 12, said second semi-cylindrical member comprising a second flange radially inwardly extending from said second semi-cylindrical member inner surface.

14. The split coupler of claim 13, wherein upon engagement of said first and second semi-cylindrical members, said first and second flanges axially align to form an annular flange radially inwardly extending from a coupler inner surface.

15. The split coupler of claim 9, wherein engagement of said first and second semi-cylindrical members axially aligns said first and second threads to form a spiral thread.

16. A split coupler, comprising:

a first semi-cylindrical member including a first thread coupled to a first semi-cylindrical member inner surface;

a second semi-cylindrical member including a second thread coupled to a second semi-cylindrical member inner surface;

a first interlocking assembly coupled to (i) a first semi-cylindrical member outer surface proximate a first semi-cylindrical member first terminal edge, and (ii) a second semi-cylindrical member outer surface proximate a second semi-cylindrical member first terminal edge;

wherein when interlocked, said first interlocking assembly resists or prevents separation of said first semi-cylindrical member first terminal edge from said second semi-cylindrical member first terminal edge;

a second interlocking assembly coupled to (i) said first semi-cylindrical member outer surface proximate a first semi-cylindrical member second terminal edge, and (ii) said second semi-cylindrical member outer surface proximate a second semi-cylindrical member second terminal edge;

wherein when interlocked, said second interlocking assembly resists or prevents separation of said first semi-cylindrical member second terminal edge from said second semi-cylindrical member second terminal edge;

at least one first alignment pin extending from one of said first semi-cylindrical member first terminal edge or said second semi-cylindrical member first terminal edge, said first alignment pin configured to be mateably received by a corresponding first alignment socket disposed in the opposing said second semi-cylindrical member first terminal edge or said first semi-cylindrical member first terminal edge, respectively; and at least one second alignment pin extending from one of said first semi-cylindrical member second terminal edge or said second semi-cylindrical member second terminal edge, said second alignment pin configured to be mateably received by a corresponding second alignment socket disposed in the opposing said second semi-cylindrical member second terminal edge or said first semi-cylindrical member second terminal edge, respectively.

17. The split coupler of claim 16, further comprising at least two said second alignment pins and at least two corresponding said second alignment sockets.

18. The split coupler of claim 16, wherein said first semi-cylindrical member and said second semi-cylindrical member together form a cylindrical coupler having a coupler inner surface defining a throughbore.

19. A split coupler, comprising:

a first semi-cylindrical member including a first thread coupled to a first semi-cylindrical member inner surface;

a second semi-cylindrical member including a second thread coupled to a second semi-cylindrical member inner surface;

a first interlocking assembly coupled to (i) a first semi-cylindrical member outer surface proximate a first semi-cylindrical member first terminal edge, and (ii) a second semi-cylindrical member outer surface proximate a second semi-cylindrical member first terminal edge;

wherein when interlocked, said first interlocking assembly resists or prevents separation of said first semi-cylindrical member first terminal edge from said second semi-cylindrical member first terminal edge;

a second interlocking assembly coupled to (i) said first semi-cylindrical member outer surface proximate a first semi-cylindrical member second terminal edge, and (ii) said second semi-cylindrical member outer surface proximate a second semi-cylindrical member second terminal edge;

wherein when interlocked, said second interlocking assembly resists or prevents separation of said first semi-cylindrical member second terminal edge from said second semi-cylindrical member second terminal edge;

at least two first alignment pins extending from one of said first semi-cylindrical member first terminal edge or said second semi-cylindrical member first terminal edge; and at least two corresponding first alignment sockets disposed in the opposing said second semi-cylindrical member first terminal edge or said first semi-cylindrical member first terminal edge, respectively;

wherein said first alignment pins are configured to be mateably received by said corresponding first alignment sockets.

20. The split coupler of claim 19, wherein said first semi-cylindrical member and said second semi-cylindrical member together form a cylindrical coupler having a coupler inner surface defining a throughbore.

* * * * *